United States Patent
Gong et al.

(10) Patent No.: US 11,827,782 B2
(45) Date of Patent: Nov. 28, 2023

(54) RUBBER BLENDS, ARTICLES THEREOF, AND METHODS OF MAKING THE SAME

(71) Applicant: ExxonMobil Chemical Patents Inc., Baytown, TX (US)

(72) Inventors: Yanan Gong, Ann Arbor, MI (US); Saifudin M. Abubakar, Shanghai (CN); Michael B. Rodgers, Cedar Park, TX (US); James P. Stokes, Katy, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 611 days.

(21) Appl. No.: 16/964,037

(22) PCT Filed: Dec. 5, 2018

(86) PCT No.: PCT/US2018/063958
§ 371 (c)(1),
(2) Date: Jul. 22, 2020

(87) PCT Pub. No.: WO2019/147343
PCT Pub. Date: Aug. 1, 2019

(65) Prior Publication Data
US 2021/0032439 A1 Feb. 4, 2021

Related U.S. Application Data

(60) Provisional application No. 62/623,085, filed on Jan. 29, 2018.

(51) Int. Cl.
*C08L 7/00* (2006.01)

(52) U.S. Cl.
CPC .......... *C08L 7/00* (2013.01); *C08L 2205/025* (2013.01); *C08L 2205/03* (2013.01)

(58) Field of Classification Search
CPC ....................................................... C08L 7/00
USPC ........................................................ 524/322
See application file for complete search history.

(56) References Cited

U.S. PATENT DOCUMENTS

| | | | |
|---|---|---|---|
| 8,609,760 B2 * | 12/2013 | Jung ......................... | C08L 7/00 524/529 |
| 8,841,383 B2 | 9/2014 | Rodgers et al. | |
| 9,469,753 B2 * | 10/2016 | D'Cruz .................. | C08L 23/283 |
| 2011/0118404 A1 * | 5/2011 | Jung ......................... | C08L 7/00 525/232 |
| 2015/0021816 A1 * | 1/2015 | D'Cruz .................... | C08K 3/06 264/236 |
| 2016/0340480 A1 | 11/2016 | Kerstetter, III et al. | |
| 2016/0347946 A1 | 12/2016 | Shannon et al. | |

FOREIGN PATENT DOCUMENTS

| | | |
|---|---|---|
| WO | 2010/039579 A | 4/2010 |
| WO | 2015/095987 A | 7/2015 |
| WO | 2016/137556 A | 9/2016 |

\* cited by examiner

*Primary Examiner* — Deve V Hall (57) ABSTRACT

Rubber blends including natural rubber and at least one propylene-based elastomer are provided herein. The rubber blends have good anti-aging properties as well as high gloss. Methods of making the rubber blends and articles made from the rubber blends, such as tires, are also provided.

18 Claims, 2 Drawing Sheets

RUBBER BLENDS, ARTICLES THEREOF, AND METHODS OF MAKING THE SAME

CROSS-REFERENCE OF RELATED APPLICATIONS

Priority Claim

This application is a National Phase Application claiming priority to PCT Application Serial No. PCT/US2018/063958, filed Dec. 5, 2018 which claims priority to and the benefit of U.S. Provisional Application No. 62/623,085, filed Jan. 29, 2018 the disclosures of which are incorporated herein by reference.

FIELD

This disclosure relates to rubber blends, particularly natural rubber blend compositions that can be used in automotive, industrial, and consumer applications. The present disclosure also relates to methods of making such rubber blends.

BACKGROUND

Most rubber compositions for use in automotive, industrial, and consumer applications require anti-degradant agents, such as antioxidants, to maintain a product's properties during long-term use. For example, exposure to sun and/or air over a period of time can cause a rubber article to undergo oxidation, which can cause product failures, such as cracking. Typical anti-degradant agents used include antioxidants, such as wax and/or diamines, such as N-(1,3-dimethylbutyl)-N'-phenyl-p-phenylenediamine (6PPD). It is believed that a diamine (e.g., 6PPD) can chemically and selectively react with ozone to achieve antiozant or antioxidant properties in a rubber blend. Further, due to a wax's solubility and mobility characteristics, it can migrate from a rubber matrix to the surface to form a physical barrier against ozone attack. However, diamines and waxes can typically cause appearance defects on a rubber article, such as discoloration and/or low gloss of the rubber article. Thus, there is a need for rubber compositions which have a combination of both antioxidant properties as well as improved gloss for improved aesthetics.

SUMMARY

It has been unexpectedly found that inclusion of a lower viscosity polypropylene-based elastomer in a rubber blend can achieve a rubber having a combination of good antioxidant properties as well as higher gloss. Further, such results may be achieved when a lower viscosity polypropylene is used in place of at least a portion of an antioxidant component, such as a wax and/or a diamine, in the rubber blend.

Thus, this disclosure relates to a rubber blend comprising:
(i) a natural rubber present in an amount of about 40 to about 60 phr (parts per hundred rubber); and
(ii) at least one propylene-based elastomer comprising at least about 80 wt % propylene-derived units and about 5.0 to about 20 wt % ethylene-derived units, by weight of the propylene-based elastomer, wherein the at least one propylene-based elastomer has a viscosity at 190° C. from about 500 to about 8000 mPa·s and a melting temperature of about 90° C. to about 105° C., and wherein the at least one propylene-based elastomer is present in an amount of about 1 to about 3 phr.

In another aspect, this disclosure relates to a rubber blend comprising:
(i) natural rubber;
(ii) at least one propylene-based elastomer comprising at least about 80 wt % propylene-derived units and about 5.0 to about 20 wt % ethylene-derived units, by weight of the propylene-based elastomer, wherein the at least one propylene-based elastomer has a viscosity at 190° C. from about 500 to about 8000 mPa·s and a melting temperature of about 90° C. to about 105° C., and wherein the at least one propylene-based elastomer is present in an amount of about 1 to about 3 phr;
(iii) polybutadiene rubber;
(iv) carbon black;
(v) naphthenic oil;
(vi) 2,2,4-trimethyl-1,2-hydroquinoline;
(vii) N-(1,3-dimethylbutyl)-N'-phenyl-p-phenylenediamine;
(viii) thermoplastic resin;
(ix) stearic acid;
(x) zinc oxide;
(xi) N-tertiarybutyl-2-benzothiazole sulfenamide;
(xii) sulfur;
(xiii) N-(cyclohexylthio)phthalimide; and
(xiv) optionally, wax.

In another aspect, this disclosure relates to a shaped article, such as a tire, comprising a rubber blend as described herein.

In yet another aspect, this disclosure relates to a method for producing a rubber blend comprising mixing about 40 to about 60 phr of natural rubber with about 1 to about 3 phr of at least one propylene-based elastomer comprising at least about 80 wt % propylene-derived units and about 5.0 to about 20 wt % ethylene-derived units, by weight of the propylene-based elastomer, wherein the at least one propylene-based elastomer has a viscosity at 190° C. from about 500 to about 8000 mPa·s and a melting temperature of about 90° C. to about 105° C.

BRIEF DESCRIPTION OF THE FIGURES

The drawings described herein are for illustrative purposes only of selected embodiments and not all possible implementations, and are not intended to limit the scope of the present disclosure.

DETAILED DESCRIPTION

I. Definitions

To facilitate an understanding of the present invention, a number of terms and phrases are defined below.

As used in the present disclosure and claims, the singular forms "a," "an," and "the" include plural forms unless the context clearly dictates otherwise.

The term "and/or" as used in a phrase such as "A and/or B" herein is intended to include "A and B", "A or B", "A", and "B".

As used herein, a "polymer" may be used to refer to homopolymers, copolymers, interpolymers, terpolymers, etc.

As used herein, when a polymer is referred to as comprising a monomer, the monomer is present in the polymer in the polymerized form of the monomer or in the derivative form of the monomer.

As used herein, when a polymer composition or blend is said to comprise a certain percentage, wt %, of a monomer, that percentage of monomer is based on the total amount of monomer units of all the polymer components of the polymer composition or blend.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber(s)."

A "polyolefin" is a polymer comprising at least 50 wt % of one or more olefin monomers. Preferably, a polyolefin comprises at least 60 wt %, or at least 70 wt %, or at least is 80 wt %, or at least 90 wt %, or at least 95 wt %, or 100 wt %, of one or more olefin monomers.

Preferably, a polyolefin comprises 1-olefins, having carbon numbers of 2 to 20, or 2 to 16, or 2 to 10, or 2 to 8, or 2 to 6.

II. Rubber Blends

This disclosure relates to rubber blend compositions including natural rubber and at least one propylene-based elastomer. It was surprisingly found that inclusion of a propylene-based elastomer along with natural rubber can result in a rubber blend with a combination of good antioxidant properties and improved gloss. This improvement in gloss can be achieved while maintaining the rubber blend's antioxidant properties (or anti-aging properties) even when antioxidant agents, such as waxes and diamines, are not present and/or are present in lower amounts.

In various embodiments, a rubber blend comprising natural rubber and at least one propylene-based elastomer is provided.

A. Natural Rubber

Natural rubber may be present in a rubber blend provided herein in an amount ≥ about 20 phr, ≥ about 40 phr, ≥ about 50 phr, ≥ about 60 phr, ≥ about 80 phr, ≥ about 100 phr, ≥ about 150 phr, or about 200 phr. In some aspects, a rubber blend may comprise natural rubber in an amount of about 20 phr to about 200 phr, about 20 phr to about 100 phr, about 40 phr to about 100 phr, about 40 phr to about 80 phr, about 40 phr to about 60 phr, about 50 phr to about 80 phr or about 50 phr to about 60 phr.

Any natural rubber can be used. As used herein, the term "natural rubber" refers to a polymer of isoprene (methylbuta-1,3-diene) but is distinguished from synthetic polyisoprene, which is the product of a metallic catalyst reaction. Natural rubber is a polyterpene synthesized in vivo via enzymatic polymerization of isopentenyl pyrophosphate. Isopentenyl pyrophosphate undergoes repeated condensation to yield cis-polyisoprene via the enzyme rubber transferase. Structurally, cis-polyisoprene is a highly stereoregular polymer with an —OH group at the alpha terminal and three to four trans units at the omega end of the molecule. The molecular weight of natural rubber can vary from about 100,000 to about 1,000,000, and the polydispersity or molecular weight distribution (MWD: Mw/Mn) can be as high as 9.0.

Various types of natural rubber are known in the art that can be used in the rubber blends herein. Suitable natural rubbers include depolymerized natural rubber, grafted methyl methacrylate natural rubber, oil-extended natural rubber, deproteinized natural rubber, epoxidized natural rubber, thermoplastic natural rubber, superior processing natural rubber, vulcanized natural rubber, and other natural rubbers. For example, natural rubber can be depolymerized to produce a liquid, low molecular weight rubber that can be used as a reactive plasticizer, processing aid, and/or base polymer. Molecular weights can range between 40,000 and 50,000. The low molecular weight rubber can be a liquid at room temperature but can also be provided on a silica carrier. Depolymerized natural rubber can be used in flexible molds for ceramics, binders for grinding wheels, and sealants. In some aspects, it can further require appropriate compounding techniques for adequate aging resistance. Liquid natural rubber can be produced by a combination of mechanical milling, heat, and the addition of one or more chemical peptizers.

Three grades of rubber with different levels of grafted methyl methacrylate are commercially available (Heveaplus MG 30, 40, and 49). These grafted methyl methacrylate rubbers are prepared by polymerizing 30, 40, and 49 parts of methyl methacrylate, respectively, in the latex before coagulation. These rubbers can be used in adhesives due to the effectiveness of the polar methacrylate group and nonpolar isoprene bonding dissimilar surfaces. Such polymers can have very high hardness (International Rubber Hardness Degrees, IRHD), with values of up to about 96. When blended with regular grades of natural rubber such as RSS2, vulcanizates with high stiffness can be achieved but can display Mooney viscosities ranging from about 60 to about 80 at typical processing temperatures.

Oil-extended natural rubber (OENR) can be produced by one of several methods. One exemplary method can include coagulation of latex with an oil emulsion or with dried field coagulum prior to coagulation; Banbury mixing of the oil and rubber; and soaking of the rubber in oilpans followed by milling to facilitate further incorporation and sheeting. Both aromatic and naphthenic oils can be used at a loading typically of about 65 phr. When compounded, filler loading can be higher than those typically found in non-oil extended rubber. The ratio of rubber to oil and oil type are denoted by a code that would read, for example, OENR 75/25N for a 75% rubber, 25% naphthenic oil material.

Deproteinized natural rubber can be produced by treating natural rubber latex with an enzyme that breaks down naturally occurring proteins and other non-rubber material into water-soluble residues. The residues can then be washed out of the rubber to leave a polymer with low sensitivity to water. Typically, natural rubber contains around 0.4% nitrogen as protein; deproteinized rubber contains typically 0.07%. Deproteinized natural rubber can be used in medical gloves and in automotive applications, seals, and bushings. Deproteinized natural rubber can have a low creep, exhibits strain relations, and enables greater control of product uniformity and consistency.

Epoxidized natural rubber can exhibit improved oil resistance, damping, and reduced gas permeability. In some aspects, epoxidized natural rubbers can have a reduced tear strength compared to natural rubber. At least two grades of epoxidized natural rubber are available, ENR 25 and ENR 50, which are 25 mol % epoxidized and 50% epoxidized, respectively. Epoxy groups are randomly distributed along the polymer chain. Calcium stearate can be used as a stabilizer. These expoxidized natural rubbers provide a number of advantages such as improved oil resistance (ENR 50 is comparable to polychloroprene), low gas permeability equivalent to that of butyl rubber, and compatibility with PVC. When compounded with silica, epoxidized natural rubber has reinforcement properties equivalent to those of carbon black but without the use of silane coupling agents.

Natural rubber blended with polypropylene, provides what is commonly referred to as a thermoplastic natural rubber material. Other natural rubbers can include a mixture or blend of two types of natural rubber with one natural rubber cross-linked, which can be referred to as Superior Processing Rubber. Superior Processing Rubber can be prepared by blending vulcanized latex with diluted field latex in levels according to the grade being prepared (SP 20, SP 40, SP 50 with 20%, 40%, and 50% cross-linked phase, respectively). Two grades are also commercially available (PA 57 and PA 80), which have a processing aid added to further facilitate factory handling. These two grades contain 80% cross-linked rubber and display high stiffness with good flow and process qualities.

Vulcanized natural rubber, often referred to as ebonite, can be prepared by vulcanizing natural rubber with high levels of sulfur. True vulcanized natural rubber, ebonite has a Young's modulus of 500 MPa and Shore D hardness of typically 75. The term "pseudoebonite" has been used to describe rubber with a Shore A hardness, or International Rubber Hardness degrees (IRHD), of 98 or Shore D hardness of 60. Ebonite has a sulfur content of 25-50 phr, and resins may also be used to obtain the required hardness or meet any desired compounding constraints. Ebonite materials can be used, for example, in battery boxes, linings, piping valves, pumps, and coverings for rollers, where chemical and corrosion resistance is required.

In some aspects, the natural rubber can be selected from the group consisting of Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646. Additional details of suitable natural rubbers is described by Subramanian in Rubber Technology 179-208 (1995).

B. Propylene-Based Elastomers

The propylene-based elastomers may be a copolymer of propylene-derived units and units derived from at least one of ethylene or a $C_{4-10}$ alpha-olefin. The propylene-based elastomer may contain at least about 60 wt propylene-derived units based on the weight of the propylene-based elastomer. The propylene-based elastomer may have limited crystallinity due to adjacent isotactic propylene units and a melting point as described herein. The crystallinity and the melting point of the propylene-based elastomer can be reduced compared to highly isotactic polypropylene by the introduction of errors in the insertion of propylene. The propylene-based elastomer is generally devoid of any substantial intermolecular heterogeneity in tacticity and comonomer composition, and also generally devoid of any substantial heterogeneity in intramolecular composition distribution.

The amount of propylene-derived units present in the propylene-based elastomer may be an amount from at least about 60 wt %, at least about 65 wt %, at least about 70 wt %, at least about 75 wt %, at least about 80 wt %, at least about 84 wt %, at least about 85 wt %, at least about 88 wt %, at least about 90 wt %, at least about 92 wt %, at least about 94 wt %, at least about 96 wt % or at least about 98 wt % of the propylene-based elastomer. Additionally or alternatively, the amount of propylene-derived units present in the propylene-based elastomer may be an amount of, at most about 98 wt %, at most about 96 wt %, at most about 94 wt %, at most about 92 wt %, at most about 90 wt %, at most about 88 wt %, at most about 85 wt %, at most about 84 wt % or at most about 80 wt % of the propylene-based elastomer. Ranges expressly disclosed include combinations of any of the above-enumerated values; e.g., about 60 to about 98 wt %, about 70 to about 98 wt %, about 80 to about 98 wt %, about 85 to about 98 wt %, about 90 to about 98 wt %, about 70 to about 96 wt %, about 75 to about 96 wt %, about 80 to 96 wt %, about 85 to about 96 wt %, about 90 to about 96 wt %, etc.

The units, or comonomers, derived from at least one of ethylene or a $C_{4-10}$ alpha-olefin may be present in an amount of about 1 to about 35 wt %, or about 2 to about 35 wt %, or about 5 to about 35 wt %, or about 7 to about 32 wt %, or about 8 to about 25 wt %, or about 10 to about 25 wt %, or about 12 to about 20 wt %, or about 8 to about 20 wt %, or about 8 to about 18 wt %, or about 5 to about 20 wt %, or about 5 to about 15 wt %, or about 2 to about 10 wt %, or about 2 to about 6.0 wt %, based on the weight of the propylene-based elastomer.

In preferred embodiments, the comonomer is ethylene, 1-hexene, or 1-octene. In some embodiments, the propylene-based elastomer comprises ethylene-derived units or consists essentially of units derived from propylene and ethylene, i.e., the propylene-based elastomer does not contain any other comonomer in an amount other than that typically present as impurities in the ethylene and/or propylene feedstreams used during polymerization, or in an amount that would materially affect the 1% secant flexural modulus and/or melt mass-flow rate of the propylene-based elastomer, or any other comonomer intentionally added to the polymerization process. In such embodiments, the propylene-based elastomer may comprise about 2 to about 25 wt %, or about 5 to about 25 wt %, or about 10 to about 25 wt %, or about 6 to about 22 wt %, or about 12 to about 20 wt, or about 7 to about 20 wt %, or about 5 to about 20 wt %, or about 5 to about 15 wt %, or about 8 to about 17 wt %, or about 9 to 16 wt %, or about 2 to about 10 wt % or about 2 to about 6.0 wt %, ethylene-derived units based on the weight of the propylene-based elastomer.

The propylene-based elastomer may comprise more than one comonomer. Preferred embodiments of a propylene-based elastomer having more than one comonomer include propylene-ethylene-octene, propylene-ethylene-hexene, and propylene-ethylene-butene polymers. In embodiments where more than one comonomer derived from at least one of ethylene or a $C_{4-10}$ alpha-olefin is present, the amount of one comonomer may be less than about 5 wt % of the propylene-based elastomer, but the combined amount of comonomers of the propylene-based elastomer is about 5 wt % or greater.

The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045X2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis. Reference is made to U.S. Pat. No. 6,525,157 which contains more details on GPC measurements, the determination of ethylene content by NMR and the DSC measurements.

In some embodiments, the propylene-based elastomer may further comprise a diene. The optional diene may be any hydrocarbon structure having at least two unsaturated bonds wherein at least one of the unsaturated bonds is readily incorporated into a polymer. For example, the optional diene may be selected from straight chain acyclic olefins, such as 1,4-hexadiene and 1,6-octadiene; branched chain acyclic olefins, such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins, such as tetrahydroindene, norbornadiene, methyl-tetrahydroindene, dicyclopentadiene, bicyclo-(2.2.1)-hepta-2,5-diene, norbornadiene, alkenyl norbornenes, alkylidene norbornenes, e.g., ethylidiene norbornene ("ENB"), cycloalkenyl norbornenes, and cycloalkyliene norbornenes (such as 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene); and cycloalkenyl-substituted alkenes, such as vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene. The amount of diene-derived units present in the propylene-based elastomer may range from an upper limit of about 15%, about 10%, about 7%, about 5%, about 4.5%, about 3%, about 2.5%, or about 1.5%, to a lower limit of about 0%, about 0.1%, about 0.2%, about 0.3%, about 0.5%, or about 1%, based on the total weight of the propylene-based elastomer. In some embodiments, the propylene-based elastomer does not contain any diene-derived units.

The propylene-based elastomer may have a triad tacticity of three propylene units, as measured by 13C NMR, of at least about 75%, at least about 80%, at least about 82%, at least about 85%, or at least about 90%. Preferably, the propylene-based elastomer has a triad tacticity of about 50 to about 99%, about 60 to about 99%, about 75 to about 99%, or about 80 to about 99%. In some embodiments, the propylene-based elastomer may have a triad tacticity of about 60 to 97%.

The propylene-based elastomer can be characterized by a melting point (Tm), which can be determined by differential scanning calorimetry (DSC). Using the DSC test method described herein, the melting point is the temperature recorded corresponding to the greatest heat absorption within the range of melting temperature of the sample. When a single melting peak is observed, that peak is deemed to be the "melting point." When multiple peaks are observed (e.g., principal and secondary peaks), then the melting point is deemed to be the highest of those peaks. It is noted that at the low-crystallinity end at which elastomers are commonly found, the melting point peak may be at a low temperature and be relatively flat, making it difficult to determine the precise peak location. A "peak" in this context is thus defined as a change in the general slope of the DSC curve (heat flow versus temperature) from positive to negative, forming a maximum without a shift in the baseline where the DSC curve is plotted so that an endothermic reaction would be shown with a positive peak.

The DSC procedures for determining Tm and Hf of the propylene-based elastomer include the following. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a DSC (Perkin Elmer Pyris One Thermal Analysis System) and cooled to about −30° C. to about −50° C. and held for 10 minutes at that temperature. The sample is heated at 10° C./min to attain a final temperature of about 200° C. The sample is kept at 200° C. for 5 minutes. Then a second cool-heat cycle is performed. Events from both cycles are recorded. The thermal output is recorded as the area under the melting peak of the sample, which typically occurs between about 0° C. and about 200° C. It is measured in Joules and is a measure of the Hf of the polymer.

The propylene-based elastomer may have a heat of fusion ("$H_f$"), as determined by DSC, of about 75 J/g or less, about 70 J/g or less, about 50 J/g or less, or about 45 J/g or less, or about 35 J/g or less. The propylene-based elastomer may have a lower limit $H_f$ of about 0.5 J/g, about 1 J/g, or about 5 J/g. For example, the $H_f$ value may be anywhere from 1.0, 1.5, 3.0, 4.0, 6.0, or 7.0 J/g, to 30, 35, 40, 50, 60, 70, or 75 J/g.

The propylene-based elastomer may have a percent crystallinity, as determined according to the DSC procedure described herein, of about 2 to about 65%, about 0.5 to about 40%, about 1 to about 30%, or about 5 to about 35%, of the crystallinity of isotactic polypropylene. The thermal energy for the highest order of propylene (i.e., 100% crystallinity) is estimated at 189 J/g. In some embodiments, the copolymer has crystallinity less than 40%, or in the range of about 0.25 to about 25%, or about 0.5 to about 22%, of isotactic polypropylene. Embodiments of the propylene-based elastomer may have a tacticity index m/r from a lower limit of about 4 or about 6 to an upper limit of about 8 or about 10 or about 12. In some embodiments, the propylene-based elastomer has an isotacticity index greater than 0%, or within the range having an upper limit of about 50% or about 25%, and a lower limit of about 3% or about 10%.

The propylene-based elastomer may have a 1% secant flexural modulus, as measured according to ASTM D790, of at least about 5.0 MPa, at least about 10 MPa, at least about 20 MPa, at least about 30 MPa, at least about 40 MPa, at least about 50 MPa, at least about 60 MPa, at least about 70 MPa, at least about 80 MPa, at least about 90 MPa, at least about 100 MPa, at least about 125 MPa, at least about 150 MPa, at least about 175 MPa, at least about 200 MPa, at least about 225 MPa, at least about 250 MPa, at least about 275 MPa, at least about 300 MPa, at least about 325 MPa, at least about 350 MPa, at least about 375 MPa, at least about 400 MPa, at least about 425 MPa, at least about 450 MPa, at least about 475 MPa, or about 500 MPa. Additionally or alternatively, the propylene-based elastomer may have a 1% secant flexural modulus, as measured according to ASTM D790, of at most about 500 MPa, at most about 475 MPa, at most about 450 MPa, at most about 425 MPa, at most about 400 MPa, at most about 375 MPa, at most about 350 MPa, at most about 325 MPa, at most about 300 MPa, at most about 275 MPa, at most about 250 MPa, at most about 225 MPa, at most about 200 MPa, at most about 175 MPa, at most about 150 MPa, at most about 125 MPa, at most about 100 MPa, at most about 90 MPa, at most about 80 MPa, at most about 70 MPa, at most about 60 MPa, at most about 50 MPa, at most about 40 MPa, at most about 30 MPa, at most about 20 MPa, at most about 10 MPa, or about 5.0 MPa. Ranges expressly disclosed include combinations of any of the above-enumerated values; e.g., about 5.0 to about 500 MPa, about 5.0 to 250 MPa, about 5.0 to about 100 MPa, about 5.0 to about 50 MPa, about 5 to about 20 MPa, about 20 to about 500 MPa, about 20 to 250 MPa, about 20 to about 100 MPa, about 20 to about 50 MPa, about 40 to about 500 MPa, about 40 to 250 MPa, about 40 to about 100 MPa, about 40 to about 70 MPa, about 40 to about 60 MPa, about 50 to about 500 MPa, about 50 to about 250 MPa, about 50 to about 100 MPa, about 100 to about 500 MPa, about 100 to about 250 MPa, about 200 to about 500 MPa, about 200 to about 450 MPa, about 200 to about 400 MPa, about 200 to about 350 MPa, about 200 to about 300 MPa, about 300 to about 500 MPa, about 300 to about 450 MPa, about 300 to about 400 MPa, about 300 to about 350 MPa, about 350 to about 500 MPa, about 350 to about 450 MPa, about 350 to about 400 MPa, etc.

The propylene-based elastomer may have a melt mass-flow rate, as measured according to ASTM D3418, 2.16 kg at 230° C., of at least about 5 g/10 min, at least about 15 g/10 min, at least about 50 g/10 min, at least about 100 g/10 min, at least about 1,000 g/10 min, at least about 2,500 g/10 min, at least about 5,000 g/10 min, at least about 7,500 g/10 min, at least about 10,000 g/10 min, at least about 12,500 g/10 min, at least about 15,000 g/10 min, at least about 17,500 g/10 min, at least about 20,000 g/10 min, at least about 22,500 g/10 min, at least about 25,000 g/10 min, at least about 27,500 g/10 min or about 30,000 g/10 min. Additionally or alternatively, the propylene-based elastomer may have a melt mass-flow rate, as measured according to ASTM D3418, 2.16 kg at 230° C., of at most about 30,000 g/10 min, at most about 27,500 g/10 min, at most about 25,000 g/10 min, at most about 22,500 g/10 min, at most about 20,000 g/10 min, at most about 17,500 g/10 min, at most about 15,000 g/10 min, at most about 12,500 g/10 min, at most about 10,000 g/10 min, at most about 7,500 g/10 min, at most about 5,000 g/10 min, at most about 2,500 g/10 min, at most about 1,000 g/10 min, at most about 100 g/10 min, at most about 50 g/10 min, at most about 15 g/10 min, or about 5 g/10 min. Ranges expressly disclosed include combinations of any of the above-enumerated values; e.g., about 5 to about 30,000 g/10 min, about 5 to about 20,000 g/10 min, about 5 to about 10,000 g/10 min, about 5 to about 1,000 g/10 min, about 5 to about 100 g/10 min, about 5 to about 50 g/10 min, about 5 to about 15 g/10 min, about 1,000 to about 30,000 g/10 min, about 1,000 to about 20,000 g/10 min, about 1,000 to about 10,000 g/10 min, about 1,000 to about 5,000 g/10 min, about 10,000 to about 30,000 g/10 min, about 10,000 to about 20,000 g/10 min, about 10,000 to about 15,000 g/10 min, about 20,000 to about 30,000 g/10 min, about 20,000 to about 27,500 g/10 min, about 22,500 to about 30,000 g/10 min, about 22,500 to about 27,500 g/10 min, about 22,500 to about 25,000 g/10 min, etc.

The propylene-based elastomer may have a single peak melting transition as determined by DSC. In one embodiment, the copolymer has a primary peak transition of about 90° C. or less, with a broad end-of-melt transition of about 110° C. or greater. The peak "melting point" ("$T_m$") is defined as the temperature of the greatest heat absorption within the range of melting of the sample. However, the copolymer may show secondary melting peaks adjacent to the principal peak, and/or at the end-of-melt transition. For the purposes of this disclosure, such secondary melting peaks are considered together as a single melting point, with the highest of these peaks being considered the $T_m$ of the propylene-based elastomer. The propylene-based elastomer may have a $T_m$ of about 110° C. or less, about 105° C. or less, about 102° C. or less, about 100° C. or less, about 92° C. or less, about 90° C. or less, about 80° C. or less, or about 70° C. or less. In some embodiments, the propylene-based elastomer has a $T_m$ of about 25 to about 105° C., about 60 to about 105° C., about 70 to about 105° C., about 90 to about 105° C., about 95 to about 105° C., or about 92 to about 102° C.

The propylene-based elastomer may have a density of about 0.850 to about 0.920 g/cm$^3$, or about 0.860 to about 0.890 g/cm$^3$, or about 0.860 to about 0.880 g/cm$^3$, at room temperature as measured per ASTM D1505.

The propylene-based elastomer may have an elongation at break, as measured per ASTM D638 of at least about 200%, at least about 500%, at least about 1000%, at least about 1500%, at least about 2000% or at least about 3000%.

The propylene-based elastomer may have a weight average molecular weight (Mw) of about 5,000 to about 5,000,000 g/mole, about 10,000 to about 1,000,000 g/mole, about 20,000 to about 750,000 g/mole, about 20,000 to about 400,000 g/mole, about 20,000 g/mole to about 250,000 g/mole, about 20,000 g/mole to about 100,000 g/mole, about 20,000 g/mole to about 70,000 g/mole, or about 30,000 g/mole to about 50,000 g/mole.

The propylene-based elastomer may have a number average molecular weight (Mn) of about 2,500 to about 250,000 g/mole, about 10,000 to about 250,000 g/mole, or about 25,000 to about 200,000 g/mole.

The propylene-based elastomer may have a z-average molecular weight (Mz) of about 10,000 to about 7,000,000 g/mole, about 80,000 to about 700,000 g/mole, or about 100,000 to about 500,000 g/mole.

The propylene-based elastomer may have a molecular weight distribution ("MWD") of about 1.5 to about 20, or about 1.5 to about 15, preferably about 1.5 to about 5, and more preferably about 1.8 to about 3, and most preferably about 1.8 to about 2.5.

The propylene-based elastomer may have a viscosity (measured at 190° C.) of at least about 400 mPa·s, at least about 500 mPa·s, at least about 600 mPa·s, at least about 800 mPa·s, at least about 1000 mPa·s, at least about 2000 mPa·s, at least about 3000 mPa·s, at least about 4000 mPa·s, at least about 5000 mPa·s, at least about 6000 mPa·s, at least about 7000 mPa·s, at least about 8000 mPa·s, or about 9000 mPa·s. In some embodiments, the propylene-based elastomer may have a viscosity (measured at 190° C.) of about 400 to 9000 mPa·s, about 500 to about 8000 mPa·s, or about 1000 to about 8000 mPa·s.

Various propylene-based elastomers (e.g., a first propylene-based elastomer, a second propylene-based elastomer, a third propylene-based elastomer, a fourth propylene-based elastomer, etc.) having any combination of the above-described properties are contemplated herein. For example, in some embodiments, the propylene-based elastomer may be a first propylene-based elastomer, a second propylene-based elastomer or a combination thereof. The first propylene-based elastomer may comprise at least about 90 wt % propylene-derived units and about 2 to about 10 wt % ethylene-derived units, by weight of the propylene-based elastomer, wherein the first propylene-based elastomer has a viscosity at 190° C. from about 500 to about 2000 mPa·s and a melting temperature of about 92° C. to about 102° C. The second propylene-based elastomer may comprise at least about 80 wt % propylene-derived units and about 5.0 to about 20 wt % ethylene-derived units, by weight of the propylene-based elastomer, wherein the second propylene-based elastomer has a viscosity at 190° C. from about 7000 to about 8000 mPa·s and a melting temperature of about 95° C. to about 105° C.

The propylene-based elastomer may comprise copolymers prepared according to the procedures described in WO 02/36651, U.S. Pat. No. 6,992,158, and/or WO 00/01745, the contents of which are incorporated herein by reference. Preferred methods for producing the propylene-based elastomer may be found in U.S. Pat. Nos. 7,232,871 and 6,881,800, the contents of which are incorporated herein by reference. The disclosure is not limited by any particular polymerization method for preparing the propylene-based elastomer, and the polymerization processes are not limited by any particular type of reaction vessel.

Suitable propylene-based elastomers may be available commercially under the trade names VISTAMAXX™ (ExxonMobil Chemical Company, Tex., USA) (e.g., VISTAMAXX™ 3000, VISTAMAXX™ 3588FL, VISTAMAXX™ 6102, VISTAMAXX™ 8380, VISTAMAXX™ 8880), VERSIFY™ (The Dow Chemical Company, Mich., USA), certain grades of TAFMER™ XM or NOTIO™ (Mitsui Company, Japan), and certain grades of SOFTEL™ (Basell Polyolefins of the Netherlands). The particular grade(s) of commercially available propylene-based elastomer suitable for use in the invention can be readily determined using methods commonly known in the art.

C. Additional Components

Antioxidants

A rubber blend described herein may further include at least one antioxidant, such as sterically hindered phenols, phosphites, amines (e.g., sterically hindered amines), diamines, quinolines, and waxes. Examples of sterically hindered phenols include, but are not limited to octadecyl-3-(3,5-di-tert.butyl-4-hydroxyphenyl)-propionate (CAS 002082-79-3) commercially available as IRGANOX™ 1076, pentaerythritol tetrakis (3-(3,5-di-tert-butyl-4-hydroxyphenyl)propionate) (CAS 6683-19-8) commercially available as IRGANOX™ 1010; and combinations thereof. Examples of phosphites include, but are not limited to liquid phosphites, such as $C_2$-$C_7$, preferably $C_2$-$C_4$, and alkyl aryl phosphites mixed structures. Non-limiting examples include mono-amylphenyl phosphites, di-amylphenyl phosphites, dimethylpropyl phosphites, 2-methylbutanyl phosphites, and combinations thereof. A suitable diamine can include, but is not limited to N-(1,3-dimethylbutyl)-N'-phenyl-p-phenylenediamine (6PPD), and a suitable quinoline can include, but is not limited to 2,2,4-trimethyl-1,2-hydroquinoline (TMQ). Suitable waxes include, but are not limited to microcrystalline wax (MC wax).

In various aspects, an antioxidant (or combination of antioxidants) may be present in a rubber blend in amount of at least about 1.0 phr, at least about 2.0 phr, at least about 3.0 phr, at least about 4.0 phr, at least about 5.0 phr, at least about 6.0 phr, at least about 7.0 phr, at least about 8.0 phr, at least about 9.0 phr, at least about 10 phr, or about 15 phr. In some aspects, an antioxidant (or combination of antioxidants) may be present in a rubber blend in amount of at least about 1.0 phr to about 15 phr, about 1.0 phr to about 10 phr, about 1.0 phr to about 8.0 phr, about 1.0 phr to about 6.0 phr, about 1.0 phr to about 5.0 phr, about 1.0 phr to about 3.0 phr, about 2.0 phr to about 10 phr, about 2.0 phr to about 8.0 phr, about 2.0 phr to about 6.0 phr, or about 2.0 phr to about 5.0 phr. In some aspects, an antioxidant can be N-(1,3-dimethylbutyl)-N'-phenyl-p-phenylenediamine, for example, in an amount of about 1.0 phr to about 6.0 phr or about 2.0 phr to about 5.0 phr. Additionally or alternatively, an antioxidant can be N-(1,3-dimethylbutyl)-2,2,4-trimethyl-1,2-hydroquinoline, for example, in an amount of about 1.0 phr to about 5.0 phr or about 1.0 phr to about 3.0 phr, particularly about 2.0 phr.

In various aspects, a rubber blend may further comprise a wax in amount of at most about 10 phr, at most about 7.0 phr, at most about 5.0 phr, at most about 2.0 phr or at most about 1.0 phr. A rubber blend may further comprise a wax in amount of about 0.0 phr to about 10 phr, about 0.0 phr to about 5.0 phr, about 0.0 phr to about 2.0 phr, about 0.0 phr to about 1.0 phr, about 1.0 phr to about 10 phr, about 1.0 phr to about 5.0 phr, or about 1.0 phr to about 2.0 phr. In some aspects, a rubber blend may comprise substantially no wax (e.g., less than 2.0 phr wax).

Further Rubber

In some aspects, a rubber blend can include a further rubber, such as synthetic rubber, polyisoprene rubber, styrene butadiene rubber (SBR), polybutadiene rubber, isoprene butadiene rubber (IBR), styrene-isoprene-butadiene rubber (SIBR), ethylene-propylene rubber, ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl(polyisobutylene/isoprene copolymer) rubber; poly(isobutylene-co-alkylstyrene), preferably isobutylene/methylstyrene copolymers such as isobutylene/meta-bromomethyl styrene, isobutylene/bromomethyl styrene, isobutylene/chloromethyl styrene, halogenated isobutylene cyclopentadiene, and isobutylene/chloromethylstyrene and mixtures thereof. Some commercial examples of synthetic rubbers include NATSYN™ (Goodyear Chemical Company), and BUDENE™ 1207 or BR 1207 (Goodyear Chemical Company). A suitable ethylene-propylene rubber is commercially available as VISTALON™ (ExxonMobil Chemical Company). A further rubber may also include another type of natural rubber as described herein.

In some aspects, a further rubber may be present in the rubber blend in an amount ≥ about 20 phr, ≥ about 40 phr, ≥ about 50 phr, ≥ about 60 phr, ≥ about 80 phr, ≥ about 100 phr, ≥ about 150 phr, or about 200 phr. In some aspects, a further rubber may be present in the rubber blend in an amount of about 20 phr to about 200 phr, about 20 phr to about 100 phr, about 40 phr to about 100 phr, about 40 phr to about 80 phr, about 40 phr to about 60 phr, about 50 phr to about 80 phr or about 50 phr to about 60 phr.

Fillers

The rubber blend can optionally include one or more fillers such as calcium carbonate, clay, mica, silica and silicates, talc, titanium dioxide, starch, and other fillers such as wood flour, and carbon black. The filler component(s) can be present in an amount from about 10 to about 200 phr, such as from about 20 to about 180 phr, about 40 to about 140 phr, about 50 to about 100 phr or about 35 to about 55 phr.

In some embodiments, the one or more fillers can be carbon black. In some embodiments, two or more carbon blacks can be used in combination, for example Regal 85 is a carbon black that has multiple particle sizes, rather than just one. Combinations also include those where the carbon blacks have different surface areas. Likewise, two different blacks which have been treated differently can also be used.

For example, a carbon black that has been chemically treated can be combined with a carbon black that has not.

Carbon black can be produced by the incomplete combustion of organic substances. There are two main production processes for the manufacture of carbon black: oil furnace process and thermal process. In the furnace process, a fuel can be burned in an excess of air to produce finely divided carbon. The furnace process can include the following production segments: reaction; filtration and separation; pelletizing; and drying. The thermal process is similar, but is a continuous furnace process. The American Society of Testing Materials (ASTM) has established a carbon black classification system based on particle size and surface oxidation, ASTM D1765. The degree of surface oxidation can affect the cure time of carbon black filled rubber compounds. In carbon black classification, the "N" denotes normal curing blacks and the "S" refers to slow curing blacks. After N or S, the first number of the three-digit suffix identifies the particle size and the remaining two digits are assigned arbitrarily.

Carbon black owes its reinforcing character in rubber to the size, shape and surface chemistry of the aggregate structures which consists of primary particles essentially spherical in shape that are chemically bonded to one another. Two important properties of carbon black are surface area and structure. Surface area depends inversely upon the size of the primary particles, and is one measure of the area available for physical interaction with the polymer. Surface area ranges from 10-140 $m^2/g$ with thermal blacks having the lowest values based on nitrogen adsorption (NSA) via ASTM D4820. Surface area is also measured by cetyl trimethylammonium bromide (CTAB) absorption. The structure of carbon black depends upon the size and grouping of these primary particles in the aggregate. The more primary particles in the aggregate, the higher structure of the carbon black due to the more complex shape and void volume (porosity). Structure varies from 35-130 $cm^3/100$ gm as measured by dibutylphthalate (DBP) oil absorption via ASTM D2414. Useful grades of carbon black as described in Rubber Technology 59-85 (1995) range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires are N330, N351, N550, N650, N660, and N762. Embodiments of the carbon black useful in, for example, innerliners or innertubes are N550, N650, N660, N762, N990, and the like.

In some embodiments, the rubber blend can include carbon black having a surface area of less than 35 $m^2/g$ and a dibutylphthalate oil absorption of less than 90 $cm^3/100$ gm. Suitable carbon black can also have a surface area ranging from a low of about 7 $m^2/g$, 10 $m^2/g$, or 15 $m^2/g$ to a high of about 25 $m^2/g$, 30 $m^2/g$ or 35 $m^2/g$. Suitable carbon black can also have a surface area ranging from a low of about 7 $m^2/g$, 10 $m^2/g$, or 23 $m^2/g$ to a high of about 25 $m^2/g$, 26 $m^2/g$ or 28 $m^2/g$. Suitable carbon black can also have a dibutylphthalate oil absorption of at least 25 $cm^3/100$ gm and less than 90 $cm^3/100$ gm, less than 80 $cm^3/100$ gm, 70 $cm^3/100$ gm, 65 $cm^3/100$ gm, or 60 $cm^3/100$ gm. The dibutylphthalate oil absorption of the carbon black can also range from a low of about 30 $cm^3/100$ gm, 35 $cm^3/100$ gm, or 40 $cm^3/100$ gm to a high of about 60 $cm^3/100$ gm, 70 $cm^3/100$ gm, or 80 $cm^3/100$ gm. Suitable carbon blacks can include, but are not limited to N550, N762, N774, N907, N990, Regal 85, and Regal 90.

In one or more embodiments, the rubber blend can optionally include one or more exfoliated clays. Exfoliated clays, also referred to as "nanoclays," are well known, and their identity, methods of preparation and blending with polymers is disclosed in, for example, JP 2000109635, 2000109605, 11310643; DE 19726278; WO98/53000; U.S. Pat. Nos. 5,091,462, 4,431,755, 4,472,538, and 5,910,523. Swellable layered clay materials can include natural or synthetic phyllosilicates, particularly smectic clays such as montmorillonite, nontronite, beidellite, volkonskoite, laponite, hectorite, saponite, sauconite, magadiite, kenyaite, stevensite and the like, as well as vermiculite, halloysite, aluminate oxides, hydrotalcite and the like. These layered clays generally comprise particles containing a plurality of silicate platelets having a thickness of from 4-20 Å or 8-12 Å, bound together and contain exchangeable cations such as $Na^+$, $Ca^{+2}$, $K^+$ or $Mg^{+2}$ present at the interlayer surfaces.

The layered clay can be intercalated and exfoliated by treatment with organic molecules (swelling agents) capable of undergoing ion exchange reactions with the cations present at the interlayer surfaces of the layered silicate. Suitable swelling agents include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R_1R_2R_3N$, wherein $R_1$, $R_2$, and $R_3$ are $C_1$ to $C_{20}$ alkyls or alkenes which can be the same or different. In one or more embodiments, the exfoliating agent is a so called long chain tertiary amine, wherein at least $R_1$ is a $C_{14}$ to $C_{20}$ alkyl or alkene.

Another class of swelling agents includes those which can be covalently bonded to the interlayer surfaces. These include polysilanes of the structure —Si(R')$_2$R$^2$ where R' is the same or different at each occurrence and is selected from alkyl, alkoxy or oxysilane and $R^2$ is an organic radical compatible with the matrix polymer of the composite.

Other suitable swelling agents include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, 4,889,885 as well as WO92/02582.

Clay or exfoliated clay can be incorporated in the nanocomposites in an amount sufficient to develop an improvement in the mechanical properties or barrier properties of the nanocomposite, e.g., tensile strength or air/oxygen permeability. Amounts generally will range from 0.5 to 15 wt %; or from 1 to 10 wt %; or from 1 to 5 wt %, based on the polymer content of the nanocomposite. Expressed in parts per hundred pounds of rubber, the clay or exfoliated clay can be present from 1 to 30 phr; or from 3 to 20 phr. In one or more embodiments, the exfoliated clay is an alkylamine-exfoliated clay.

Thermoplastic Resin

The rubber blend can optionally include one or more thermoplastic resins. The thermoplastic resin can be any material that is not a "rubber" and that is a polymer or polymer blend considered by persons skilled in the art as being thermoplastic in nature, e.g. a polymer that softens when exposed to heat and returns to its original condition when cooled to room temperature. The thermoplastic resin can contain one or more polyolefins, including polyolefin homopolymers and polyolefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers.

Illustrative polyolefins can be prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth) acrylates and/or vinyl acetates. Preferably, the thermoplastic resin is unvulcanized or non cross-linked.

In one or more embodiments, the thermoplastic resin contains polypropylene. The term "polypropylene" as used herein broadly means any polymer that is considered a "polypropylene" by persons skilled in the art (as reflected in at least one patent or publication), and includes homo, impact, and random polymers of propylene. Preferably, the polypropylene used in the compositions described herein has a melting point above 110° C., includes at least 90 wt % propylene units, and contains isotactic sequences of those units. The polypropylene can also include atactic sequences or syndiotactic sequences, or both. The polypropylene can have a high MFI (e.g., from a low of 10, or 15, or 20 g/10 min to a high of 25 to 30 g/10 min. Others have a lower MFI, e.g., "fractional" polypropylenes which have an MFI less than 1.0. Those with high MFI can be preferred for ease of processing or compounding.

In one or more embodiments, a thermoplastic resin is or can include isotactic polypropylene. Preferably, a thermoplastic resin contains one or more crystalline propylene homopolymers or copolymers of propylene having a melting temperature of from 110° C. to 170° C. or higher as measured by DSC. Preferred copolymers of propylene include, but are not limited to, terpolymers of propylene, impact copolymers of propylene, random polypropylene and mixtures thereof. Preferred comonomers have 2 carbon atoms, or from 4 to 12 carbon atoms. Preferably, the comonomer is ethylene. Such thermoplastic resins and methods for making the same are described in U.S. Pat. No. 6,342,565. The term "random polypropylene" as used herein broadly means a single phase copolymer of propylene having up to 9 wt %, preferably 2 wt % to 8 wt % of an alpha olefin comonomer. Preferred alpha olefin comonomers have 2 carbon atoms, or from 4 to 12 carbon atoms. Preferably, the alpha olefin comonomer is ethylene.

Suitable thermoplastic resins can also include polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof. Suitable thermoplastic polyamides (nylons) can include crystalline or resinous, high molecular weight solid polymers including copolymers and terpolymers having recurring amide units within the polymer chain. Polyamides can be prepared by polymerization of one or more epsilon lactams such as caprolactam, pyrrolidione, lauryllactam and aminoundecanoic lactam, or amino acid, or by condensation of dibasic acids and diamines Both fiber-forming and molding grade nylons are suitable. Examples of such polyamides are polycaprolactam (nylon-6), polylauryllactam (nylon-12), polyhexamethyleneadipamide (nylon-6, 6) polyhexamethyleneazelamide (nylon-6,9), polyhexamethylenesebacamide (nylon-6,10), polyhexamethyleneisophthalamide (nylon-6, IP) and the condensation product of 11-amino-undecanoic acid (nylon-11). Additional examples of satisfactory polyamides (especially those having a softening point below 275° C.) are described in 16 Encyclopedia of Chemical Technology 1-105 (John Wiley & Sons 1968), Concise Encyclopedia of Polymer Science 748-761 (John Wiley & Sons, 1990), and 10 Encyclopedia of Polymer Science and Technology 392-414 (John Wiley & Sons 1969). Commercially available thermoplastic polyamides can be advantageously used with linear crystalline polyamides having a softening point or melting point between 160° C. and 260° C. being preferred.

Suitable thermoplastic polyesters can further include the polymer reaction products of one or a mixture of aliphatic or aromatic polycarboxylic acids esters of anhydrides and one or a mixture of diols. Examples of satisfactory polyesters include poly (trans-1,4-cyclohexylene $C_{2-6}$ alkane dicarboxylates such as poly(trans-1,4-cyclohexylene succinate) and poly(trans-1,4-cyclohexylene adipate); poly(cis or trans-1,4-cyclohexanedimethylene) alkanedicarboxylates such as poly(cis-1,4-cyclohexanedimethylene) oxalate and poly-(cis-1,4-cyclohexanedimethylene) succinate, poly ($C_{2-4}$ alkylene terephthalates) such as polyethyleneterephthalate and polytetramethylene-terephthalate, poly($C_{2-4}$ alkylene isophthalates such as polyethyleneisophthalate and polytetramethylene-isophthalate and like materials. Preferred polyesters are derived from aromatic dicarboxylic acids such as naphthalenic or phthalic acids and $C_2$ to $C_4$ diols, such as polyethylene terephthalate and polybutylene terephthalate. Preferred polyesters will have a melting point in the range of 160° C. to 260° C.

Poly(phenylene ether) (PPE) thermoplastic resins which can be used are well known, commercially available materials produced by the oxidative coupling polymerization of alkyl substituted phenols. They are generally linear, amorphous polymers having a glass transition temperature in the range of 190° C. to 235° C. These polymers, their method of preparation and compositions with polystyrene are further described in U.S. Pat. No. 3,383,435.

The thermoplastic resins can further include polycarbonate analogs of the polyesters described above such as segmented poly(ether co-phthalates); polycaprolactone polymers; styrene resins such as copolymers of styrene with less than 50 mol % of acrylonitrile (SAN) and resinous copolymers of styrene, acrylonitrile and butadiene (ABS); sulfone polymers such as polyphenyl sulfone; copolymers and homopolymers of ethylene and $C_2$ to $C_8$ α-olefins, in one or more embodiments a homopolymer of propylene derived units, and in one or more embodiments a random copolymer or block copolymer of ethylene derived units and propylene derived units, and like thermoplastic resins as are known in the art.

In some aspects, a thermoplastic resin may be present in a rubber blend in amount of about 1.0 phr to about 15 phr, about 1.0 phr to about 10 phr, about 1.0 phr to about 8.0 phr, about 1.0 phr to about 6.0 phr, about 1.0 phr to about 5.0 phr, about 1.0 phr to about 3.0 phr, about 2.0 phr to about 10 phr, about 2.0 phr to about 8.0 phr, about 2.0 phr to about 6.0 phr, or about 2.0 phr to about 5.0 phr.

Processing Aids

The rubber blend can optionally include one or more processing aids. Suitable processing aids can include, but are not limited to, plasticizers, tackifiers, extenders, chemical conditioners, homogenizing agents, anti-scorch agents, and peptizers such as mercaptans, petroleum and vulcanized vegetable oils, mineral oils, paraffinic oils, polybutene oils, naphthenic oils, aromatic oils, waxes, resins, rosins, or other synthetic fluids having a lower pour point, lower emission, etc., compared to paraffinic or mineral oil and the like. Some commercial examples of processing aids are SUNDEX™ (Sun Chemicals) and FLEXON™ (ExxonMobil Chemical Company).

Preferred plasticizers include polyalphaolefins (PAOs), high purity hydrocarbon fluid compositions (HPFCs) and Group III basestocks such as those described in WO 2004/014998. Preferred PAOs include oligomers of decene and co-oligomers of decene and dodecene. Preferred PAOs are available under the trade name SuperSyn™, SpectraSyn™ PAO, and ELEVASTT™ from ExxonMobil Chemical Company.

Suitable polybutene oils have an Mn of less than 15,000 g/mol. Preferred polybutene oils also can include homopolymer or copolymer of olefin derived units having from 3 to 8 carbon atoms, preferably from 4 to 6 carbon atoms. In yet another embodiment, the polybutene can be a homopolymer or copolymer of a $C_4$ raffinate. An embodiment of preferred low molecular weight polymers termed "polybutene" polymers is described in, for example, Synthetic Lubricants and High-Performance Functional Fluids 357-392 (Leslie R. Rudnick & Ronald L. Shubkin, ed., Marcel Dekker 1999) (hereinafter "polybutene processing oil" or "polybutene").

In one or more embodiments, the polybutene oil can be a copolymer comprising at least isobutylene derived units, and optionally 1-butene derived units, and/or 2-butene derived units. In one or more embodiments, the polybutene can be a homopolymer if isobutylene, or a copolymer of isobutylene and 1-butene or 2-butene, or a terpolymer of isobutylene and 1-butene and 2-butene, wherein the isobutylene derived units can be from 40 to 100 wt % of the copolymer, the 1-butene derived units can be from 0 to 40 wt % of the copolymer, and the 2-butene derived units can be from 0 to 40 wt % of the copolymer. In one or more embodiments, the polybutene can be a copolymer or terpolymer wherein the isobutylene derived units are from 40 to 99 wt % of the copolymer, the 1-butene derived units are from 2 to 40 wt % of the copolymer, and the 2-butene derived units are from 0 to 30 wt % of the copolymer. In yet another embodiment, the polybutene can be a terpolymer of the three units, wherein the isobutylene derived units are from 40 to 96 wt % of the copolymer, the 1-butene derived units are from 2 to 40 wt % of the copolymer, and the 2-butene derived units are from 2 to 20 wt % of the copolymer. In yet another embodiment, the polybutene can be a homopolymer or copolymer of isobutylene and 1-butene, wherein the isobutylene derived units are from 65 to 100 wt % of the homopolymer or copolymer, and the 1-butene derived units are from 0 to 35 wt % of the copolymer.

Polybutene processing oils typically can have a number average molecular weight (Mn) of less than 10,000 g/mol, less than 8,000 g/mol, or less than 6,000 g/mol. In one or more embodiments, the polybutene oil can have a number average molecular weight of greater than 400 g/mol, and greater than 700 g/mol, or greater than 900 g/mol. A preferred embodiment can be a combination of any lower limit with any upper limit herein. For example, in one or more embodiments of the polybutene described, the polybutene can have a number average molecular weight of from 400 g/mol to 10,000 g/mol, and from 700 g/mol to 8,000 g/mol. Useful viscosities of the polybutene processing oil ranges from 10 to 6,000 cSt (centistokes) at 100° C., or from 35 to 5,000 cSt at 100° C., or is greater than 35 cSt at 100° C., or is greater than 100 cSt at 100° C.

The natural rubber blend can include one or more types of polybutene as a mixture, blended either prior to addition to the elastomer, or with the elastomer. The amount and identity (e.g., viscosity, Mn, etc.) of the polybutene processing oil mixture can also be varied to achieve some other viscosity or molecular weight. In this manner, the physical properties of the composition can be controlled. More particularly, the phrases "polybutene processing oil", or "polybutene processing oils" include a single oil or a composition of two or more oils used to obtain any viscosity or molecular weight (or other property) desired, as specified in the ranges disclosed herein.

A processing aid, such as a processing oil or oils (e.g., naphthenic oil), can be present in the natural rubber blend described from about 1 to about 70 phr; or from about 1 to about 60 phr; or from about 1 to about 30 phr; or from about 1 to about 10 phr; or from about 1 to about 5 phr; or from about 2 to about 30 phr; or from about 2 to about 10 phr; or from about 2 to about 5 phr. In one or more embodiments, naphthenic, aliphatic, paraffinic and other aromatic resins and oils are substantially absent from the composition. By "substantially absent", it is meant that naphthenic, aliphatic, paraffinic and other aromatic resins are present, if at all, to an extent no greater than 2 phr in the composition.

Curing Agents and Accelerators

The rubber blend can optionally include one or more other components and additives customarily used in rubber mixes, such as pigments, accelerators, and curing materials. Generally, polymer compositions, e.g., those used to produce tires, are cross-linked. It is known that the physical properties, performance characteristics, and durability of vulcanized rubber compounds can be directly related to the number (cross-link density) and type of crosslinks formed during the vulcanization reaction. (See, e.g., Helt et al., *The Post Vulcanization Stabilization for NR*, Rubber World 18-23 (1991). Curing agents used for cross-linking include sulfur, zinc oxide, and fatty acids. Peroxide cure systems can also be used. Generally, polymer compositions can be cross-linked by adding curative molecules, for example sulfur, metal oxides (i.e., zinc oxide), organometallic compounds, radical initiators, etc. followed by heating. In particular, the following are common curatives that can be included in a rubber blend: ZnO, CaO, MgO, $Al_2O_3$, $CrO_3$, FeO, $Fe_2O_3$, and NiO. These metal oxides can be used in conjunction with the corresponding metal stearate complex (e.g., $Zn(Stearate)_2$, $Ca(Stearate)_2$, $Mg(Stearate)_2$, and $Al(Stearate)_3$), or with stearic acid, and either a sulfur compound or an alkylperoxide compound. (See also, *Formulation Design and Curing Characteristics of NBR Mixes for Seals*, Rubber World 25-30 (1993). This method can be accelerated and is often used for the vulcanization of natural rubber blends.

Accelerators can include amines, guanidines, thioureas, thiazoles, thiurams, sulfenamides, sulfenimides, thiocarbamates, xanthates, and the like. Acceleration of the cure process can be accomplished by adding to the composition an amount of the accelerant. The mechanism for accelerated vulcanization of natural rubber involves complex interactions between the curative, accelerator, activators and polymers. In some aspects, the entire available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR 90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), N,N'-diethyl thiourea.

In some embodiments, at least one curing agent can be present in a rubber blend from about 0.2 to about 15 phr, from about 0.5 to 10 phr, from about 1.0 to about 10 phr, or from about 1.0 to about 5.0 phr. Curing agents include those components described above that facilitate or influence the cure of elastomers, such as metals, accelerators, sulfur, peroxides, and other agents common in the art, and as described above.

In one embodiment, a rubber blend is provided comprising: natural rubber (e.g., about 50 phr); at least one propylene-based elastomer (e.g., about 1 to about 3 phr) comprising at least about 80 wt % propylene-derived units and about 5.0 to about 20 wt % ethylene-derived units, by weight of the propylene-based elastomer, wherein the at least one propylene-based elastomer has a viscosity at 190° C. from about 500 to about 8000 mPa·s and a melting temperature of about 90° C. to about 105° C.; polybutadiene rubber (e.g., about 50 phr); carbon black (e.g., about 45 phr); naphthenic oil (e.g., about 3.5 phr); 2,2,4-trimethyl-1,2-hydroquinoline (e.g., about 2 phr); N-(1,3-dimethylbutyl)-N'-phenyl-p-phenylenediamine (e.g., about 2 to about 5 phr); thermoplastic resin (e.g., about 2.5 phr); stearic acid (e.g., about 1.0 phr); zinc oxide (e.g., about 5.0 phr); N-tertiarybutyl-2-benzothiazole sulfenamide (e.g., about 1.65 phr); sulfur (e.g., about 0.8 phr); N-(cyclohexylthio)phthalimide (e.g., about 0.25 phr); and optionally, wax (e.g., about 0.0 to about 2.0 phr).

D. Properties

Advantageously, rubber blends described herein have a combination of good anti-aging or antioxidant properties, good mechanical properties, improved appearance and good processability. Additionally, rubber blends described herein unexpectedly can achieve improved appearance, for example, improved gloss, while maintaining the rubber blend's anti-aging properties even when antioxidant agents, such as waxes and diamines, are absent and/or are present in lower amounts.

With respect to the rubber blends' improved appearance, a rubber blend described herein can have a gloss, measured according to ISO 7668, at 20° of ≥ about 20, ≥ about 25, ≥ about 30, ≥ about 35, ≥ about 40, ≥ about 45, ≥ about 50, ≥ about 55, or about 60. For example, a rubber blend described herein can have a gloss, measured according to ISO 7668, at 20° of about 20 to about 60, about 25 to about 60, about 30 to about 60, about 30 to about 50, about 35 to about 60 or about 35 to about 50. Additionally or alternatively, a rubber blend described herein can have a gloss, measured according to ISO 7668, at 60° of ≥ about 55, ≥ about 60, ≥ about 65, ≥ about 70, ≥ about 75, ≥ about 80, or about 85. For example, a rubber blend described herein can have a gloss, measured according to ISO 7668, at 60° of about 55 to about 85, about 60 to about 85, about 65 to about 85, about 65 to about 80, about 65 to about 75, about 70 to about 85, or about 70 to about 80. Additionally or alternatively, a rubber blend described herein can have a gloss, measured according to ISO 7668, at 85° of ≥ about 65, ≥ about 70, ≥ about 72, ≥ about 75, ≥ about 77, ≥ about 80, ≥ about 85, ≥ about 90, or about 95. For example, a rubber blend described herein can have a gloss, measured according to ISO 7668, at 85° of about 65 to about 95, about 70 to about 95, about 75 to about 95, about 77 to about 95, about 77 to about 90, or about 77 to about 85. In some embodiments, a rubber blend described herein can have one or more: a) a gloss measured at 20° of ≥ about 30; b) a gloss measured at 60° of ≥ about 65; and d) a gloss measured at 85° of ≥ about 77.

With respect to the rubber blends' good mechanical properties, a rubber blend described herein can have a peel strength ≥ about 8.0 kgf/cm, ≥ about 10 kgf/cm, ≥ about 12 kgf/cm, ≥ about 14 kgf/cm, ≥ about 16 kgf/cm, ≥ about 18 kgf/cm, ≥ about 20 kgf/cm, ≥ about 22 kgf/cm, ≥ about 24 kgf/cm, ≥ about 26 kgf/cm, ≥ about 28 kgf/cm, or about 30 kgf/cm. For example, a rubber blend described herein can have a peel strength of about 8.0 to about 30 kgf/com, about 10 to about 28 kgf/cm or about 12 to about 28 kgf/cm.

With respect to the rubber blend's anti-aging or antioxidant properties, a rubber blend described herein can exhibit good ozone cracking performance. For example, a rubber blend described herein can experience substantially no cracking (NC) after about 2.0 hours, after about 4.0 hours, after about 6.0 hours, after about 8.0 hours, after about 24 hours, after about 50 hours, after about 72 hours, after about 120 hours, or after about 150 hours.

III. End-Uses

The rubber blends described herein can be useful for the fabrication of shaped articles and parts made by using standard elastomer processing techniques like extrusion, calendaring, and molding (e.g., injection or compression molding). Thus, a shaped article comprising a rubber bland described herein is provided. Such articles include seals (such as used in building construction or appliances), roofing, tubing, hoses, strips, joints, isolators, wire and cable jackets, medical device components (including syringe parts and catheters), packaging, trays, toys, sporting equipment, furniture, kitchen devices, handles, belts (including power transmission and conveyor belts) and appliance components. Also included are articles for transportation vehicles such as cars, trucks, trains, airplanes, and boats, including tires, weather seals, noise and/or vibration insulation seals and mounts, disks, diaphragms, cups, joints, tubing, hoses, gaskets, o-rings, belts (including synchronous, asynchronous, serpentine, and V belts), wiper blades, mud flaps, skins, mats, boots, bellows, and trim.

In one or more embodiments, a rubber blend can be at least partially adhered or otherwise at least partially attached to a second component or substrate to form a composite structure. The second component can be, or include, another rubber blend according to one or more embodiments described, an unplasticized rubber blend, a thermoset rubber, a thermoplastic resin or plastic, a thermoplastic vulcanizate, or a metal. In one or more embodiments, the two or more structures are at least partially adhered or otherwise at least partially attached to one another to form a composite structure. Illustrative composite structures include, but are not limited to, molded corners, molded end caps, glass run channels, trunk seals, tailgate seals, cowl seals, gap fillers, glass encapsulation, cut line seals, door seals, hood-to-radiator seals, roof line seals, rocker panels, sashes, and belt-line seals.

IV. Methods of Producing Rubber Blends

In various aspects, methods of producing a rubber blend as described herein are provided. The methods may include mixing a natural rubber in an amount as described herein (e.g., about 40 to about 60 phr) with at least one propylene-based elastomer as described herein in an amount as described herein (e.g., about 1 to about 3 phr). In some aspects, the at least one propylene-based elastomer can comprise at least about 80 wt % propylene-derived units and about 5.0 to about 20 wt % ethylene-derived units, by weight of the propylene-based elastomer, wherein the at least one propylene-based elastomer has a viscosity at 190° C. from about 500 to about 8000 mPa·s and a melting temperature of about 90° C. to about 105° C.

Additionally or alternatively, additional components, such as antioxidants, further rubbers, fillers, thermoplastic resins, processing aids, anti-scorch agents, curing agents, and/or accelerators, may be added as well. In some aspects, one or more of the following may be added: an antioxidant, such as a diamine (e.g., about 1 to about 5 phr) and/or optionally, a wax (e.g., zero to about 2 phr), a filler, such as carbon black (e.g., about 35 to about 55 phr), and a further rubber, (e.g., about 40 to about 60 phr).

The components of the rubber blend can be mixed by combining the components in any suitable mixing device such as a Banbury™ mixer, Brabender™ mixer or preferably a mixer/extruder. Mixing can be performed at temperatures up to the melting point of the elastomer and/or rubber used in the composition. In some aspects, mixing can be performed at a rate sufficient to allow graphite and/or clay to exfoliate and become uniformly dispersed within the polymer to form a nanocomposite.

Suitable mixing rates can range from about 30 RPM to about 8,500 RPM. In one or more embodiments, the mixing rate can range from a low of about 30 RPM, 40 RPM, 60 RPM, 100 RPM, or 300 RPM to a high of about 500 RPM, 2,500 RPM, or 8,000 RPM. In one or more embodiments, the mixing rate can range from a low of about 500 RPM, 1,000 RPM, or 2,500 RPM to a high of about 5,500 RPM, 6,500 RPM, or 8,000 RPM. In one or more embodiments, the mixing rate can range from a low of about 100 RPM, 750 RPM, or 1,500 RPM to a high of about 6,500 RPM, 7,500 RPM, or 8,500 RPM. In one or more embodiments, the mixing rate can range from a low of about 5,000 RPM, 5,700 RPM, or 6,000 RPM to a high of about 7,000 RPM, 7,500 RPM, or 7,700 RPM.

In one or more embodiments, the mixing temperature can range from about 40° C. to about 340° C. In one or more embodiments, the mixing temperature can range from about 80° C. to 300° C. In one or more embodiments, the mixing temperature can range from a low of about 30° C., 40° C., or 50° C. to a high of about 70° C., 170° C., or 340° C. In one or more embodiments, the mixing temperature can range from a low of about 80° C., 90° C., or 100° C. to a high of about 120° C., 250° C., or 340° C. In one or more embodiments, the mixing temperature can range from a low of about 85° C., 100° C., or 115° C. to a high of about 270° C., 300° C., or 340° C.

In at least one specific embodiment, 70% to 100% of the one or more elastomers can be mixed at a rate noted above for 20 to 90 seconds, or until the temperature reaches from 40° C. to 60° C. Then, about ⅔ of the filler, and the remaining amount of elastomer, if any, can be added to the mixer, and mixing can continue until the temperature reaches from 90° C. to 160° C. Next, any remaining filler can be added, as well as processing oil, and mixing can continue until the temperature reaches from 140° C. to 190° C. The finished mixture can then be finished by sheeting on an open mill and allowed to cool to from 60° C. to 100° C. when the curatives are added.

EXAMPLES

Example 1—Preparation of Rubber Blends

Rubber blends were prepared using the propylene-based elastomers described below in Table 1.

TABLE 1

| Propylene Based Elastomers | | |
| --- | --- | --- |
| Propylene-Based Elastomer | Molecular Weight, g/mol | Ethylene ($C_2$) content, wt % |
| Vistamaxx ™ 8880 | ~40,000 | 6 |
| Vistamaxx ™ 8380 | ~40,000 | 12 |

Vistamaxx™ 8880 and Vistamaxx™ 8380 propylene-based copolymers are commercially available from ExxonMobil Chemical Company.

Four rubber blends (Blends 1-4) and one comparative rubber blend (Comparative Blend A) were prepared and have the following compositions (amounts in phr) according to Table 2 below.

TABLE 2

| | Rubber Blends | | | | |
| --- | --- | --- | --- | --- | --- |
| | Comparative Rubber Blend A | Rubber Blend 1 | Rubber Blend 2 | Rubber Blend 3 | Rubber Blend 4 |
| Natural Rubber TSR 10 (Indian Standard Natural Rubber (ISNR)-20), commercially available from Solaris Corp. | 50 | 50 | 50 | 50 | 50 |
| Polybutadiene Rubber (BR0150L) (Cisamer PBR01), commercially available from BP Chemicals | 50 | 50 | 50 | 50 | 50 |
| Carbon Black N 330, commercially available from SKI Carbon | 45 | 45 | 45 | 45 | 45 |
| Naphthenic Oil (IPOL 501), commercially available from Sah Petroleum | 3.5 | 3.5 | 3.5 | 3.5 | 3.5 |

TABLE 2-continued

| | Rubber Blends | | | | |
|---|---|---|---|---|---|
| | Comparative Rubber Blend A | Rubber Blend 1 | Rubber Blend 2 | Rubber Blend 3 | Rubber Blend 4 |
| MC Wax (Anitlux 654), commercially available from Rheinchemie | 2 | | | 2 | 2 |
| TMQ (Agerite ® resin D pastilles SMPL PT), commercially available from Vanderbilt Chemicals LLC | 2 | 2 | 2 | 2 | 2 |
| 6PPD (Antage 6C), commercially available from Kawaguchi Chemical Industry | 4.5 | 4.5 | 4.5 | 2.5 | 2.5 |
| SP1068, commercially available from SI Group | 2.5 | 2.5 | 2.5 | 2.5 | 2.5 |
| Stearic Acid (Lubstric 995), commercially available from Godrej Industries Ltd. | 1 | 1 | 1 | 1 | 1 |
| Vistamaxx ™ 8880, commercially available from ExxonMobil Chemical Co. | | 2 | | 2 | |
| Vistamaxx ™ 8380, commercially available from ExxonMobil Chemical Co. | | | 2 | | 2 |
| Multipass level | 160.5 | 160.5 | 160.5 | 160.5 | 160.5 |
| Zinc Oxide, commercially available from Seido Chemical Industry Co., Ltd. | 5 | 5 | 5 | 5 | 5 |
| TBBS (Sanceler NS-G), commercially available from Sanshin Chem. Ind. | 1.65 | 1.65 | 1.65 | 1.65 | 1.65 |
| Sulfur, commercially available from The Standard Chemical Co. | 0.8 | 0.8 | 0.8 | 0.8 | 0.8 |
| PVI (anti-scorch CTP), commercially available from Kawaguchi Chemical Industry | 0.25 | 0.25 | 0.25 | 0.25 | 0.25 |
| Total phr | 168.2 | 168.2 | 168.2 | 168.2 | 168.2 |

Mixing details used for preparation of the blends is shown below in Tables 3 and 4.

TABLE 3

| Banbury Mixing Profile | | | | | | |
|---|---|---|---|---|---|---|
| | | Comparative Rubber Blend A | Rubber Blend 1 | Rubber Blend 2 | Rubber Blend 3 | Rubber Blend 4 |
| MB Mixing (Mixer: 1.57L Banbury) | | | | | | |
| Start temp | [° C.] | 50.0 | 50.0 | 50.0 | 50.0 | 50.0 |
| Dump Temp | [° C.] | 153.0 | 150.0 | 155.0 | 150.0 | 149.0 |
| Mixing Time | [min:sec] | 5:00 | 5:00 | 5:00 | 5:00 | 5:00 |
| Rotor Speed | [RPM] | 80 | 80 | 80 | 80 | 80 |
| Theoretical Weight | [gms] | 1250.9 | 1249.7 | 1249.7 | 1248.2 | 1248.2 |
| Actual Weight | [gms] | 1251.3 | 1254.1 | 1256.0 | 1253.0 | 1255.0 |

TABLE 3-continued

Banbury Mixing Profile

| | | Comparative Rubber Blend A | Rubber Blend 1 | Rubber Blend 2 | Rubber Blend 3 | Rubber Blend 4 |
|---|---|---|---|---|---|---|
| Final Mixing (Mixer: 1.57 L Banbury) | | | | | | |
| Start temp | [° C.] | 50.0 | 50.0 | 50.0 | 50.0 | 50.0 |
| Dump Temp | [° C.] | 87.0 | 91.8 | 91.0 | 90.0 | 93.0 |
| Mixing Time | [min:sec] | 2:00 | 2:00 | 2:00 | 2:00 | 2:00 |
| Rotor Speed | [RPM] | 40 | 40 | 40 | 40 | 40 |
| Theoretical Weight | [gms] | 1201.4 | 1200.3 | 1200.3 | 1198.9 | 1198.9 |
| Actual Weight | [gms] | 1203.2 | 1201.0 | 1201.7 | 1198.3 | 1200.4 |

TABLE 4

Mixing Sequence Details

| | Mixing |
|---|---|
| Time [min:sec] | Addition order |
| 0:00 | Add polymer |
| 0:30 | 2/3 of carbon black |
| 1:00 | Add remaining carbon black + oil + remaining powders |
| 2:50 | RAM sweep |
| 5:00 | Dump @ 160° C. |
| | Finalization |
| Time [min:sec] | Addition order |
| 0:00 | Add ½ 1$^{st}$ pass, powders, remaining 1$^{st}$ pass |
| 1:00 | RAM sweep |
| 2:00 | Dump at 100-105° C. |

Example 2—Atomic Force Microscopy (AFM) Analysis of Comparative Rubber Blend A and Rubber Blends 1 and 2

Figure 1:
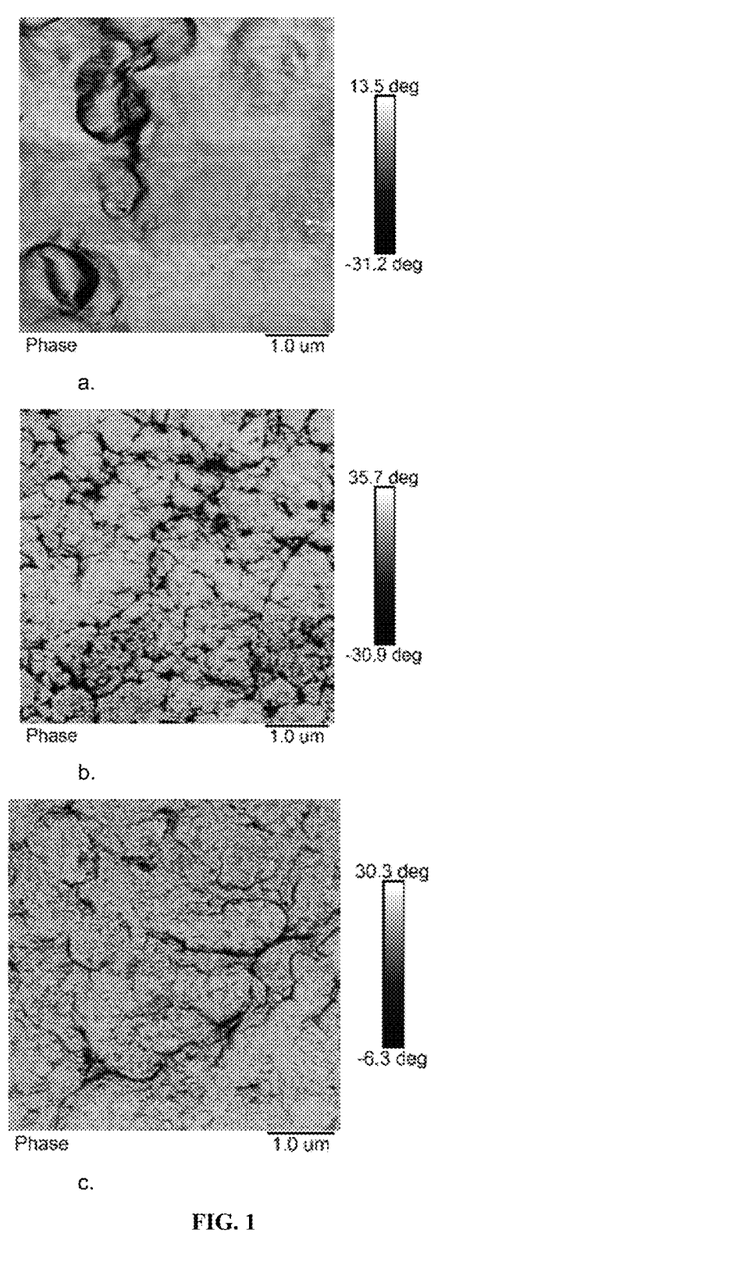
FIGS. 1a, 1b, and 1c illustrate atomic force microscopy (AFM) images for Comparative Rubber Blend A, Rubber Blend 1 and Rubber Blend 2, respectively.

AFM (atomic force microscopy) was conducted for Comparative Rubber Blend A, Rubber Blend 1 and Rubber Blend 2, and the results are shown in FIGS. 1a, 1b and 1c, respectively. For AFM testing, samples were prepared by cryo-surfacing at −120° C. Microscopy viewing was conducting using the Tapping Mode on a Bruker Dimension ICON AFM with a TESPA cantilever having a resonance frequency of about 320 Hz, scan rate of 1 Hz, and scan pixel size of 256×256. As shown in FIGS. 1a-1c, compared to Comparative Rubber Blend A, the surface morphology was changed with the addition of Vistamaxx™ 8880 (Rubber Blend 1) and Vistamaxx™ 8380 (Rubber Blend 2) in place of wax, which indicates the effect of migration of the propylene-based elastomer.

Example 3—Surface Gloss Analysis of Comparative Rubber Blend A and Rubber Blends 1 and 2

Surface gloss for Comparative Rubber Blend A, Rubber Blend 1 and Rubber Blend 2, was studied as described in ISO 7668. The results are shown in Table 5. Improvement of gloss was observed when Vistamaxx™ 8880 and Vistamaxx™ 8380 replaced wax.

TABLE 5

Gloss

| | 20° Gloss | | 60° Gloss | | 85° Gloss | |
|---|---|---|---|---|---|---|
| | Average value | σ | Average value | σ | Average value | σ |
| Comparative Rubber Blend A | 28.1 | 4.88 | 60.8 | 3.68 | 76.8 | 9.61 |
| Rubber Blend 1 | 45.1 | 3.13 | 74.3 | 2.15 | 79.2 | 3.92 |
| Rubber Blend 2 | 35.3 | 2.04 | 70.7 | 0.33 | 80.2 | 3.48 |

Example 4—Ozone Cracking Analysis of Rubber Blends

An ozone cracking analysis was performed on the rubber blends. The results are shown in Table 6. The results show that Vistamaxx™ 8880 and Vistamaxx™ 8380 used in Rubber Blends 1 and 2 in place of 2 phr of wax provided comparable performance with Comparative Rubber Blend A. Also, in place of 2 phr 6PPD, Vistamaxx™ 8380 used in Rubber Blend 4 functioned well to maintain the anti-oxidant properties.

TABLE 6

Ozone Cracking

| | Comparative Rubber Blend A | Rubber Blend 1 | Rubber Blend 2 | Rubber Blend 3 | Rubber Blend 4 |
|---|---|---|---|---|---|
| Ozone cracking (50 pphm, 40° C. & 20% extension) | | | | | |
| After 2 hours (hrs) rating | NC | NC | NC | NC | NC |
| After 4 hrs rating | NC | NC | NC | NC | NC |
| After 6 hrs rating | NC | NC | NC | NC | NC |
| After 8 hrs rating | NC | NC | NC | NC | NC |
| After 24 hrs rating | NC | NC | NC | NC | NC |
| After 50 hrs rating | NC | NC | NC | NC | NC |
| After 72 hrs rating | NC | NC | NC | NC | NC |
| After 120 hrs rating | NC | NC | NC | A-2 | NC |
| After 150 hrs rating | NC | NC | NC | A-2 | NC |

Example 5—Processability Analysis of Rubber Blends

The processing properties of the rubber blends were analyzed via Mooney testing, RPA (Rubber Process Analyzer, commercially available from Alpha Technologies and test methods conducted per STM D2604), dispersion rating and green strength. The results for Mooney, RPA, dispersion rating and green strength are shown in Tables 7, 8, 9 and 10 respectively. The results show that when Vistamaxx™ 8880 or Vistamaxx™ 8380 replace wax or 6PPD, processability of the rubber blends was comparable with Comparative Rubber Blend A.

TABLE 7

Mooney Results

| | | Comparative Rubber Blend A | Rubber Blend 1 | Rubber Blend 2 | Rubber Blend 3 | Rubber Blend 4 |
|---|---|---|---|---|---|---|
| Mooney ML(1 + 8)+ Stress Relax at 100° C., test time 8 mins, preheat 1 min, decay 2 mins | | | | | | |
| Test temp | [° C.] | 100 | 100 | 100 | 100 | 100 |
| Mm | [MU] | 40 | 40.90 | 40.20 | 40.20 | 40.40 |
| tMm | [min.] | 9 | 9.00 | 9.00 | 9.00 | 9.00 |
| ML(1 + 4) | [MU] | 41.5 | 42.60 | 41.70 | 41.80 | 42.00 |
| Mooney Scorch on MV2000 at 125° C./60 min | | | | | | |
| t5 | [min] | 26.12 | 26.27 | 25.73 | 25.63 | 26.33 |
| t35 | [min] | 28.86 | 29.03 | 28.4 | 28.67 | 29.44 |
| Mooney scorch on MV2000 at 125° C./60 min, preheat 1 min | | | | | | |
| t5 | [min.] | 26.12 | 26.27 | 25.73 | 25.63 | 26.33 |
| t35 | [min.] | 28.86 | 29.03 | 28.40 | 28.67 | 29.44 |

TABLE 8

RPA Results

| | | Comparative Rubber Blend A | Rubber Blend 1 | Rubber Blend 2 | Rubber Blend 3 | Rubber Blend 4 |
|---|---|---|---|---|---|---|
| Subtest 1: Frequency & Strain Sweep of Uncured Compound @ 100° C. | | | | | | |
| Tan Delta @ 2%/1 Hz | [ ] | 0.61 | 0.61 | 0.62 | 0.61 | 0.60 |
| Tan Delta @ 2%/10 Hz | [ ] | 0.50 | 0.48 | 0.50 | 0.49 | 0.49 |
| Subtest 2: Compound Cure; 160° C./30 minutes/ 1.667 Hz (100 cpm)/7% Strain (0.5° arc) | | | | | | |
| Min. Torque | dNm | 1.60 | 1.65 | 1.63 | 1.61 | 1.65 |
| Max. Torque | dNm | 9.98 | 10.05 | 10.00 | 9.92 | 9.90 |
| T10 | dNm | 2.42 | 2.48 | 2.46 | 2.43 | 2.47 |
| T50 | dNm | 5.73 | 5.82 | 5.81 | 5.73 | 5.72 |
| T90 | dNm | 9.14 | 9.21 | 9.16 | 9.08 | 9.07 |
| Subtest 3: Strain Sweep on Cured Compound @ 100° C./1 Hz | | | | | | |
| Tan Delta @ 10% | [ ] | 0.18 | 0.18 | 0.18 | 0.18 | 0.18 |
| Subtest 4: Strain Sweep on Cured Compound @ 100° C./10 Hz | | | | | | |
| Tan Delta @ 10% | [ ] | 0.21 | 0.21 | 0.22 | 0.21 | 0.21 |

TABLE 9

Dispersion rating

| | Comparative Rubber Blend A | Rubber Blend 1 | Rubber Blend 2 | Rubber Blend 3 | Rubber Blend 4 |
|---|---|---|---|---|---|
| Dispersion rating | A7 | A7 | A7 | A7 | A7 |

TABLE 10

Green Strength

| | | Comparative Rubber Blend A | Rubber Blend 1 | Rubber Blend 2 | Rubber Blend 3 | Rubber Blend 4 |
|---|---|---|---|---|---|---|
| Time to decay 75% from strain endpoint | [min] | 501 | 383 | 385 | 330.854 | 533.568 |
| Green Strength | [N/mm] | 0.16 | 0.16 | 0.17 | 0.18 | 0.20 |

Example 6—Peel Strength Analysis of Rubber Blends

Figure 2:
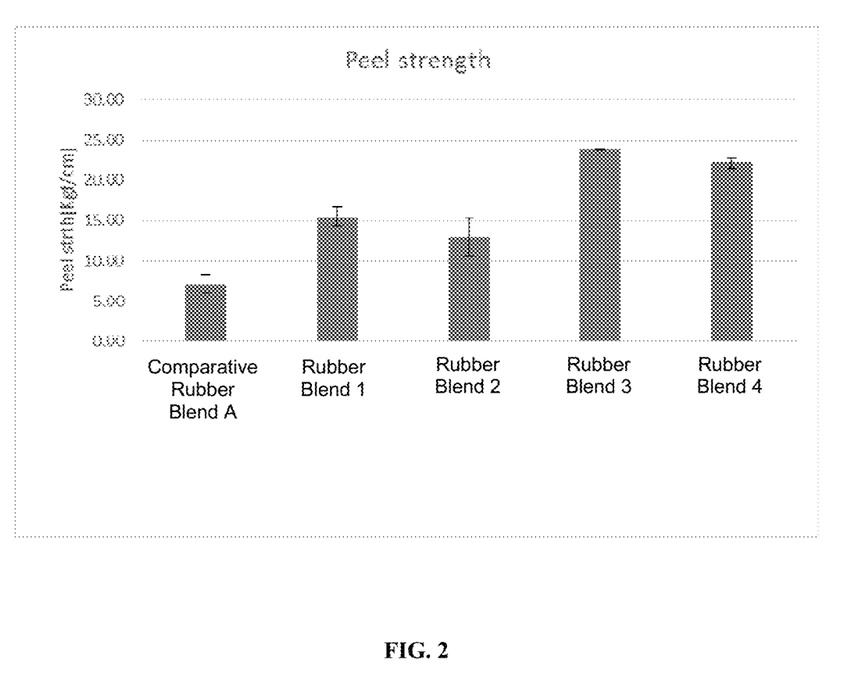
FIG. 2 illustrates peel strength for Comparative Rubber Blend A and Rubber Blends 1-4.

Peel strength was tested for the rubber blends and the results are shown in FIG. 2. As shown in FIG. 2, peel strength improved with addition of Vistamaxx™ 8880 or Vistamaxx™ 8380 including when Vistamaxx™ 8880 or Vistamaxx™ 8380 replaced a portion of 6PPD.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise, whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements, and vice versa.

What is claimed is:

1. A rubber blend comprising:
   (i) a natural rubber present in an amount of about 40 to about 60 phr;
   (ii) a second rubber present in an amount of about 40 to about 60 phr; and
   (iii) at least one propylene-based elastomer comprising at least about 80 wt % propylene-derived units and about 5 to about 20 wt % ethylene-derived units, by weight of the propylene-based elastomer, wherein the at least one propylene-based elastomer has a viscosity at 190° C. from about 500 to about 8000 mPa·s and a melting temperature of about 90° C. to about 105° C., and wherein the at least one propylene-based elastomer is present in an amount of about 1 to about 3 phr.

2. The rubber blend of claim 1, wherein the at least one propylene-based elastomer is a blend of:
   (a) a first propylene-based elastomer comprising at least about 90 wt % propylene-derived units and about 2 to about 10 wt % ethylene-derived units, by weight of the propylene-based elastomer, wherein the first propylene-based elastomer has a viscosity at 190° C. from about 500 to about 2,000 mPa·s and a melting temperature of about 92° C. to about 102° C.; and
   (b) a second propylene-based elastomer comprising at least about 80 wt % propylene-derived units and about 5.0 to about 20 wt % ethylene-derived units, by weight of the propylene-based elastomer, wherein the second propylene-based elastomer has a viscosity at 190° C. from about 7,000 to about 8,000 mPa·s and a melting temperature of about 95° C. to about 105° C.

3. The rubber blend of claim 1, wherein the rubber blend has a peel strength ≥ about 10 kgf/cm.

4. The rubber blend of claim 1, wherein the rubber blend has one or more of the properties:
   a) a gloss measured at 20° of ≥ about 30;
   b) a gloss measured at 60° of ≥ about 65; and
   c) a gloss measured at 85° of ≥ about 77.

5. The rubber blend of claim 1, further comprising at least one antioxidant in an amount of about 1 to about 6 phr.

6. The rubber blend of claim 5, wherein the at least one antioxidant is N-(1,3-dimethylbutyl)-N'-phenyl-p-phenylenediamine.

7. The rubber blend of claim 1, further comprising a wax in an amount of at most about 2 phr.

8. The rubber blend of claim 1, substantially free of a wax.

9. The rubber blend of claim 1, further comprising a filler present in an amount of about 35 to about 55 phr.

10. The rubber blend of claim 9, wherein the filler comprises carbon black.

11. The rubber blend of claim 1, further comprising at least one additional agent selected from the group consisting of an oil, an accelerator, a curing agent, an anti-scorch agent, a tackifier, a thermoplastic resin, and combinations thereof.

12. An article comprising the rubber blend of claim 1.

13. The A rubber blend of claim 1, wherein the second rubber is polybutadiene rubber.

14. A method of producing a rubber blend comprising the steps of combining (a) about 40 to about 60 phr of natural rubber; (b) about 40 to about 60 phr of a second rubber; and (c) about 1 to about 3 phr of at least one propylene-based elastomer comprising at least about 80 wt % propylene-derived units and about 5 to about 20 wt % ethylenederived units, by weight of the propylene-based elastomer, wherein the at least one propylene-based elastomer has a viscosity at 190° C. from about 500 to about 8,000 mPa·s and a melting temperature of about 90° C. to about 105° C. and recovering a rubber blend.

15. The method of claim 14, wherein the at least one propylene-based elastomer is a blend of:
   (a) a first propylene-based elastomer comprising at least about 90 wt % propylene-derived units and about 2 to about 10 wt % ethylene-derived units, by weight of the propylene-based elastomer, wherein the first propylene-based elastomer has a viscosity at 190° C. from about 500 to about 2,000 mPa·s and a melting temperature of about 92° C. to about 102° C.; and
   (b) a second propylene-based elastomer comprising at least about 80 wt % propylene-derived units and about 5 to about 20 wt % ethylene-derived units, by weight of the propylene-based elastomer, wherein the second propylene-based elastomer has a viscosity at 190° C. from about 7,000 to about 8,000 mPa·s and a melting temperature of about 95° C. to about 105° C.

16. The method of claim 14, further combining one or more of the following to the natural rubber, the second rubber, and the at least one propylene-based elastomer:
   (a) about 1 to about 6 phr antioxidant;
   (b) zero to about 2 phr wax; and
   (c) about 35 to about 55 phr filler.

17. The method of claim 14, further comprising combining at least one additional agent selected from the group consisting of an oil, an accelerator, a curing agent, an anti-scorch agent, a tackifier, a thermoplastic resin, and combinations thereof.

18. The method of claim 14, wherein the rubber blend has one or more of the following properties:
   a) a peel strength ≥ about 10 kgf/cm;
   b) a gloss measured at 20° of ≥ about 30;
   c) a gloss measured at 60° of ≥ about 65; and
   d) a gloss measured at 85° of ≥ about 77.

* * * * *